United States Patent [19]

Rowley et al.

[11] Patent Number: 4,833,668
[45] Date of Patent: May 23, 1989

[54] FAULT DETECTION IN A FULL DUPLEX OPTICAL COMMUNICATIONS SYSTEM

[75] Inventors: Robin Rowley, Colchester; Gregory P. Coombs, Martlesham Heath, both of England

[73] Assignee: British Telecommunications public limited company, United Kingdom

[21] Appl. No.: 71,675

[22] Filed: Jul. 9, 1987

[30] Foreign Application Priority Data

Jul. 10, 1986 [GB] United Kingdom ............... 8616873

[51] Int. Cl.$^4$ .............................................. H04B 9/00
[52] U.S. Cl. ....................................... 370/1; 455/606; 455/607; 455/612; 455/617
[58] Field of Search ................... 455/606–608, 455/612, 617, 618, 619; 370/1, 3, 4, 79, 24, 29, 30, 2

[56] References Cited

U.S. PATENT DOCUMENTS

| 3,546,384 | 12/1970 | Brigham ................................ | 179/15 |
| 4,087,818 | 5/1978 | Kreutal ................................. | 370/78 |
| 4,326,287 | 4/1982 | Abramson ............................. | 370/29 |
| 4,618,952 | 10/1986 | Bochor ................................ | 370/78 |

FOREIGN PATENT DOCUMENTS 0071192 of 0000 European Pat. Off. .
0040351 of 0000 European Pat. Off. .
2144748 3/1985 United Kingdom ............... 370/78

OTHER PUBLICATIONS

Electronics Letters, vol. 21, No. 14, 4th Jul. 1985, pp. 628–629, London, GB; Hall et al: "Bidirectional Transmission Over 11 km of Single Mode Optical Fibre at 34 Mbit/s Using 1.3 mum LED's and Directional Couplers".

Primary Examiner—Robert L. Griffin
Assistant Examiner—Leslie Van Beek
Attorney, Agent, or Firm—Nixon & Vanderhye

[57] ABSTRACT

An optical duplex system may continue to operate after a break in a fibre if light is reflected at the break and received back at the transmitting station, and that station is unable to identify the origin of the data. To prevent this, in a simple 2-channel duplex system, data transmitted from one end is inverted prior to transmission and reinverted at the receiving end, while information from the other end is transmitted and received without inversion. If there is a break, the stations at both ends will receive inverted data and the fault is quickly revealed. In a 2×4 channel multiplex system, one channel from one end is inverted before transmission, while three channels from the opposite end are inverted before transmission.

17 Claims, 3 Drawing Sheets

FAULT DETECTION IN A FULL DUPLEX OPTICAL COMMUNICATIONS SYSTEM

BACKGROUND OF THE INVENTION

1. Field of the Invention

In optical communications systems a communications signal is propagated along an optical transmission line, such as an optical fibre or other waveguide by modulation of one or more parameters of an optical carrier. Such transmission lines are expensive to lay and equipment used at their terminations or at repeaters to amplify the optical signals along the transmission line add to this expense. Optical fibre transmission lines have been installed widely during the last few years but already demand for lines is exceeding the capacity of those transmission lines so that it is now necessary to install more transmission lines to provide additional capacity or to increase the capacity of the existing optical transmission lines.

2. Description of the Related Art

One way of increasing the capacity of existing lines is to establish bi-directional transmission over a single optical fibre transmission line. Advantageously, duplex transmission may be used, transmitting data in both directions simultaneously using the same bandwidth. In practice, this is achieved by splicing directional optical couplers onto both ends of a fibre. The directional optical couplers sort the signals from the transmission line in accordance with their direction of travel. Modifying an optical transmission line to take advantage of duplex transmission requires very little investment, typically only a few hundred dollars and is therefore very much cheaper than the provision of a new line.

Another way in which the capacity of an existing optical transmission line can be increased is to increase the rate of data or information transmission along the line and use multiplexing techniques such as time division multiplexing or wavelength division multiplexing, to transmit two or more channels of information simultaneously in the same direction over the same optical transmission line. Time division multiplexing is particularly efficient as many streams or channels of data or information can be interleaved with one another at the transmission end of the line, transmitted over the line at high speed and then, at the downstream end of the line, demultiplexed and separated into their separate channels. Naturally, additional equipment is required to carry out multiplexing and demultiplexing operations but the cost of this equipment is still much less than the cost of laying a corresponding number of new optical fibre transmission lines.

Whilst these techniques for increasing the capacity of an optical fibre transmission line are possible, they normally require the use of expensive hardware to overcome the problems and limitations associated with them. Accordingly with conventional systems these techniques have not led to the advantages that might, theoretically, have been gained.

With bi-directional transmission techniques, problems can arise in detecting faults in the line such as a break in a waveguide or a failure of a repeater or a far end transmitter. If the waveguide breaks at least some of the light being transmitted in one direction along the waveguide from one end may be reflected and returned to the one end. Usually, insufficient transmission takes place across the broken ends of the fibre to allow one end of the transmission line to receive information transmitted from the other end. However, if the light transmitted in the one direction is reflected at the break the one end of the transmission line may still receive a channel of information of sufficient quality for this channel of information to appear to supervisory and error detecting circuits associated with the one end to be a completely normal channel of information. When the transition takes place between the information transmitted from the other end and that reflected from the one end, normally errors are detected and line decoders and any demultiplexers lose alignment. However within a short period, provided that the information reflected from the break is of sufficient quality, the line decoders and demultiplexers regain alignment and appear to be operating correctly. Thus, after the transient interruption no fault is detected at either end of the optical transmission line even though no information is being transmitted directly from one end of the other, or vice versa. The transient detected by supervisory circuits and any detected malfunction of supervisory telemetry is likely to be interpreted as a supervisory fault since the system is apparently working correctly and supervisory systems are often unreliable.

Reflective fault conditions may arise in a number of ways. For example, if a fibre is broken the two ends at the break may be highly reflecting. Also, faults at transmitters, receivers, repeaters, couplers, connectors and other system components may reflect or couple light back along the waveguide. Reflections from connectors may give rise to fault identification problems if there is also a transmitter failure at the far end from the receiver, especially over a short line. Normally reflections from connectors particularly at the distant end are small compared with the signal transmitted from that far end, and do not significantly impair the quality of signal transmission. In the event of a significant reduction in the magnitude of the signal transmitted from the other end, the reflected signal may become dominant. If the quality of the received reflected signal is sufficiently good then after some transient change-over effects the receiver and associated performance monitors interpret this reflected signal as a valid channel of information, and again this is unlikely to be identified.

Couplers may also, under certain circumstances, couple light so that it is detected at the originating end.

In this specification, the term 'reflective fault condition' is intended to cover any situation where there is reflection or coupling of signal or data or any other fault which results in data being received at the end from which it orginated.

SUMMARY OF THE INVENTION

According to the present invention, there is provided a bi-directional optical communications system comprising first and second transmitting and receiving stations at opposite ends of a single optical transmission line, means for inverting data from one or both stations prior to transmission on the line so that the originating end is identifiable and means associated with one or both stations for checking received data and for indicating a fault condition if data received at its station was transmitted from that same end.

Each station may be adapted to transmit a single channel of data on said line, the first station having an inverter to invert informatin to be transmitted and the second station having an inverter to invert received information.

Alternatively, each station may transmit a plurality of channels which are multiplexed onto the line.

There may be two or more stations at each end of the transmission line, each transmitting one or more streams of data which are multiplexed onto the transmission line.

The invention also provides a method of operating an optical communications system comprising inverting some but not all data to be transmitted between stations at opposite ends of a single optical transmission line so that the originating end is identifiable, and checking the inversion condition of data received at one or both ends to identify a fault condition if data received at an end was transmitted from that same end.

The present invention provides a very cheap, easy and simple system for identifying reflective faults such as fibre breaks and also, preferably, other faults in multiplexed data transmission. The use of a simple inversion technique imposes little or no extra delay on the signal transmission and little or no modification of the existing hardware likely to be associated with an optical transmission system. The addition of inverters to standard systems may not be required, as many transmission systems (eg hardware for 565 Mbit/sec data transmission) have the facility for data inversion without modification or the need for extra components. If it is necessary to provide inverters, then inverters capable of operating at a bit rate of an incoming stream of information are readily available, cheap and reliable. Existing equipment associated with an optical fibre transmission line is usually able to identify when inversion has occurred and so is able to assist in identifying the existence of a fault on the transmission line. In such cases the present invention can be applied with very little expense or change to the existing system.

Thus the present invention may advantageously be applied to a simple duplex transmission system in which a first channel of information is transmitted from the one end of an optical fibre transmission line to the other end and a second channel of information is transmitted from the other end to the one end, and the signal transmitted over the first channel is inverted with respect to the second channel. At the reception side of the first channel the information is also inverted to re-invert the inverted information to restore it to its original condition before it is sent on. However, with this arrangement, if reflected signals become dominant, for example because the single optical fibre transmission line is broken at any point along its path and/or a mis-match occurs at any connector and/or a transmitter fails, so that the inverted signal transmitted from the one end of the transmission line along the first channel is reflected at the break, or from connectors or other sources of reflection, then the inverted signal is returned to the receiver side of the one end of the transmission line. The receiver side of the one end of the transmission line normally receives non-inverted information transmitted from the other end of the transmission line and so, in the event of a break, mis-match or failure, the receiver side of the second channel suddenly starts to receive inverted data.

When the information transmitted is line coded, provided the reflected signal has sufficient strength, the receiver decoder circuitry may lock onto this reflected signal and attempt to decode it. Most coding sets such as the mBnB coding system have their code sets designed so that they are assymetric in the sense that some codes are not recognised as valid after inversion. With such a line coded signal the receipt of invalid code words by the receiver generates an error indication in spite of the decoder apparently receiving a stream of information. The transmitted information may be coded in ways other than being line coded. For example, it may have a framed structure including a frame alignment signal. In such a case the frame alignment signal would be inverted in the reflected signal. This inverted frame alignment signal would not be recognised by the conventional circuitry in the receiver and again an error indication is provided. Another way in which the inversion of the information may be detected by conventional circuitry forming part of the receiver is that channel signalling information is inverted and so is not received correctly, and this again leads to an error indication.

The same thing happens at the other end of the transmission line, since the receptin side of the first channel at the other end of the transmission line which normally receives and reinverts inverted information, receives and inverts uninverted information transmitted from the other end over the second channel. Thus, the decoding circuitry of the receiver at the other end of the transmission line again receives inverted information so that, once again, a malfunction is detected and an alarm is raised. This is a particularly simple example, which is illustrated further below.

BRIEF DESCRIPTION OF THE DRAWINGS

Various examples of systems in accordance with this invention will now be described with reference to the accompanying drawings, in which.

DESCRIPTION OF THE PREFERRED EMBODIMENTS

Figure 1:
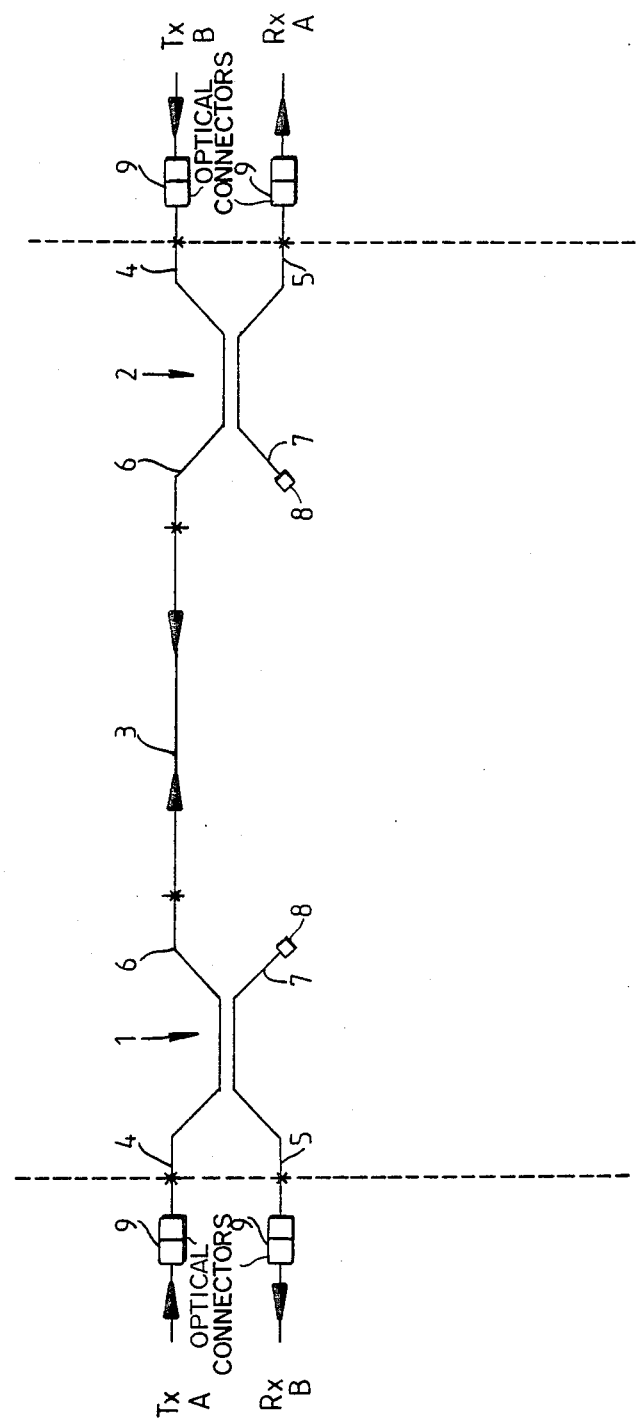
FIG. 1 is a diagram of a bi-directional optical transmission line for duplex operation.

Simple optical fibre transmission systems include two optical fibres one of which is used to carry information in channel A from a first end to an second end whilst the second optical fibre is used to transmit return information in channel B from the second end to the first end. To increase the capacity of an optical fibre transmission line the line is modified as shown in Figure 1 by the inclusion of directional optical couplers 1 and 2 which are spliced onto a single optical fibre transmission line 3 and which sort the signals on the single optical fibre transmission line 3 in accordance with the direction of their travel. Each directional optical coupler 1 and 2 comprises a transmit port 4, a receiver port 5 and an input/output port 6. A fourth port 7 of the optical directional coupler is taken to an index matching termination 8. There is very little near-end coupling or cross talk between ports 4 and 5 and, in general, signals injected into port 4 are divided between port 6, where signals are carried through to the transmission line 3, and port 7 where the signals are absorbed by the matching termination 8. Signals reaching the coupler 1 or 2 from the transmission line 3 are divided between port 5, where the signals are carried through to the receiver, and port 4 where the signals are carried through to the transmitter where they are absorbed and do not significantly impair transmission from the light emitter. Thus, once the transmission line 3 has the optical couplers 1 and 2 spliced to it, it appears to its ends exactly the same as a conventional two fibre transmission line since it has four terminals and signals input into port 4 of coupler 1 appear at the output port 5 of coupler 2 whilst signals input into the input port 4 of coupler 2 appear at the output port 5 of coupler 1. The input and output ports 4 and 5 are coupled via optical connectors 9 to conventional terminating equipment.

Figure 2:
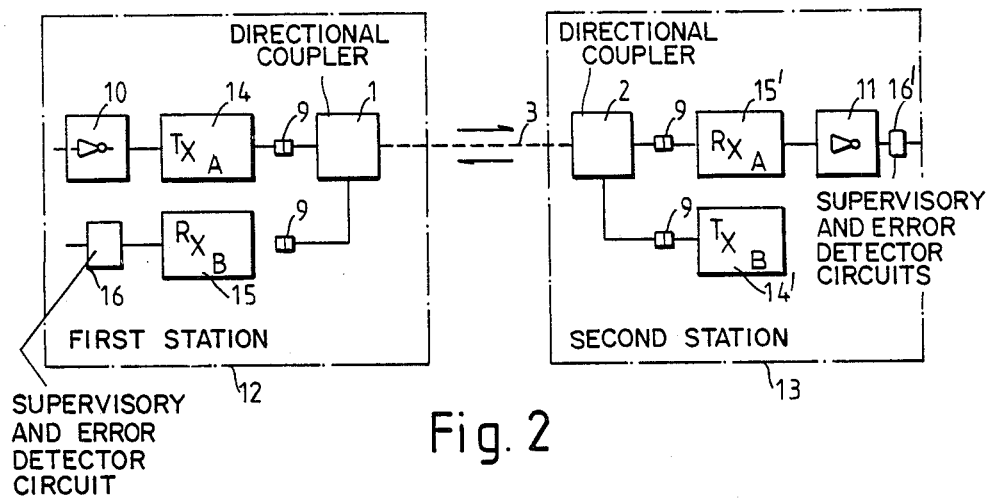
FIG. 2 illustrates a first example of the present invention as applied to a duplex optical transmission line.

FIG. 2 illustrates a transmission system in accordance with a first embodiment of the present invention, having a first station 12 at one end of transmission line 3 and a second station 13 at the other end. The stations have respective transmitting portions 14, 14' (transmitting on channels A and B respectively) and receiving portions 15, 15'. As compared with the system of FIG. 1, inverters 10 and 11 are included and each receiver 15, 15' is associated with supervisory and error detecting circuits 16, 16'. Inverter 10 is provided in the first station 12 to invert data transmitted in the A channel by transmitter 14, and inverter 11 is provided downstream of receiver 15' which receives the A channel at the second station 13. Thus data inverted before transmission is reinverted after reception. Data on the B channel is unaltered in normal operation.

In normal fault-free operation, data transmitted on the A channel from station 12 travels in inverted form on the duplex link 3 and is reinverted at the receiving end by inverter 11. Supervisory fault and error detector 16' carries out normal fault checks, including checks of the frame alignment signal, supervisory checks and checks for faults in line code. Data on channel B is transmitted by transmitter 14' at station 13 in uninverted format and is received by receiver 15 at station 12. Detector 16 checks for faults.

Assume now that a break occurs in duplex line 3, and the two surfaces at the break reflect incident light. In this event, light transmitted from transmitter 14 in station 12 is received back at that station. Similarly, light transmitted from station 13 is returned to that station. Considering channel A data from station 12, this is inverted by inverter 10, transmitted by transmitter 14, received by receiver 15 and passed to detector 16 in inverted form. Depending on the line code used for transmission, the line code check by the detector may quickly identify that inverted data is being received and thus an error condition is indicated. Alternatively or additionally, the inversion may alter supervisory signals such as the frame alignment signal so that a fault condition is indicated. Detector 16' will, likewise, be receiving inverted data (transmitted on channel B by transmitter 14') and will indicate a fault condition.

Depending on the distance between the two stations and the location of a break, the intensity of the reflected signal may be sufficient for detection at one end but insufficient for detection at the other end. The detector associated with the end receiving no data will indicate a fault condition, and the other detector, receiving incorrectly inverted data, will also indicate that a break has occurred. If the two ends of fibre at the break have low reflectivity it is possible that neither receiver will be able to detect a signal, and the fault condition should be indicated at both stations.

Figure 3:
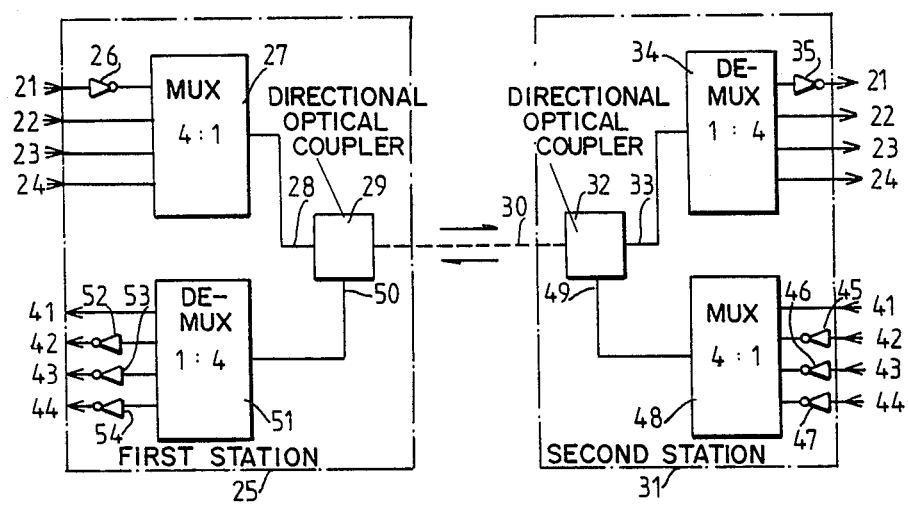
FIG. 3 is a diagram of a system for duplex transmission of two sets of four 565 Mbit/sec signals over a single transmission line.

In the second example of the invention. illustrated in FIG. 3, four 565 Mbit/sec input data sreams 21, 22, 23, 24 enter station 25. Data in the first stream 21 is inverted by inverter 26, and the four streams are then interleaved by 4:1 multiplexer 27. The multiplexed signal is then fed to an input port 28 of a directional optical coupler 29 and from there fed over a transmission line 30 consisting of a single optical fibre. At the other end of line 30 is station 31 having a second directional coupler 32 which couples the multiplexed data from station 25 to an output port 33 and thence through a 4:1 disinterleaver 34. Channel 21 is reinverted by a second inverter 35 during normal, fault-free working.

For information channels 41, 42, 43, 44 transmitted simultaneously in the opposite direction from station 31 to station 25, inversion occurs in three of the channels. Inverters 45, 46, 47 invert data in channels 42, 43 and 44 respectively, and then the four channels of data are interleaved on multiplexer 48 and fed via port 49 to coupler 32 onto line 30. Again assuming fault-free operation at the receiving end in station 25, the data stream enters coupler 29, exits via port 50 and is demultiplexed by demultiplexer 51. Reinversion of the three inverted channels occurs in inverters 52, 53 and 54.

It will be seen that in this more complex system there are two different kinds of fault which may arise and, ideally, can be identified and corrected where possible. The first is a reflective fault condition (rarely automatically correctable) and the other is a misalignment or desynchronisation of multiplexed data channels. This second kind of fault is correctable. If a break were to occur the data in streams 21, 22, 23 and 24 would be reflected and returned to station 25. One of the four streams is already inverted, and three streams would be inverted by inverters 52, 53 and 54. This would result in four inverted streams if the stream already inverted was not reinverted, or two inverted streams if the inverted data was reinverted. The presence of four inverted streams is easily identified as a reflective fault condition. However, the presence of two inverted channels could be due to a reflective fault or to a loss of alignment. The system therefore needs to be able to distinguish between these two conditions and to correct losses of alignment.

Figure 4:
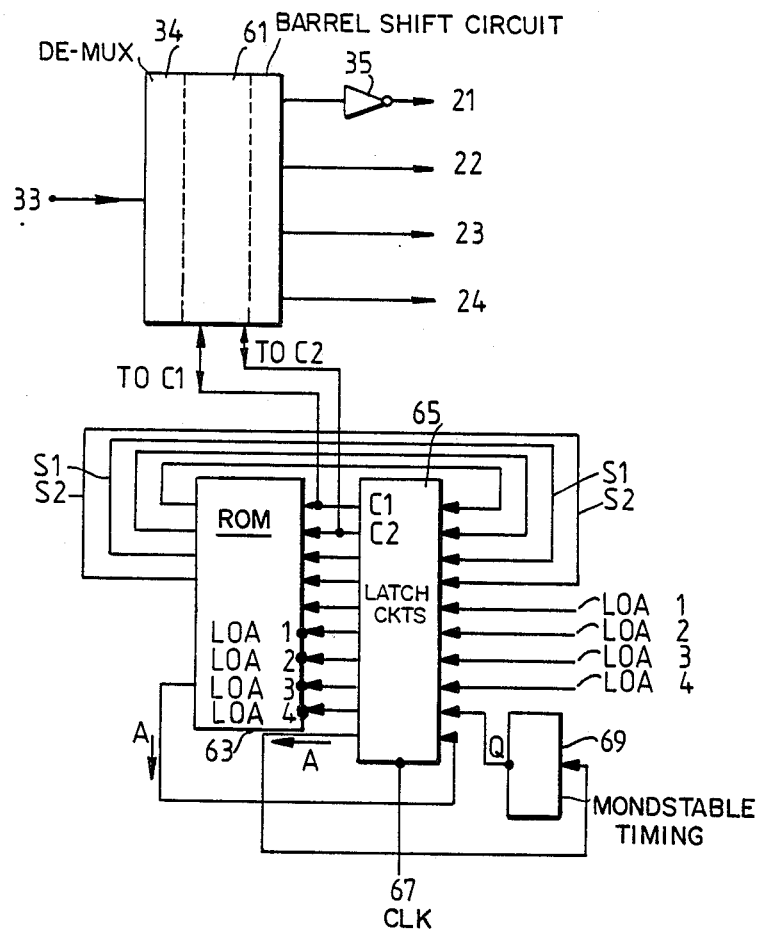
FIG. 4 is a block diagram of one leg of the system of FIG. 3, showing additional elements.

To achieve this identification, and correction where possible, the two received streams of data are fed from the stations 25, 31 to respective conventional line terminal transmission equipment, in this case 565 Mbit/sec equipment (not shown) which includes supervisory and error detection circuitry (shown, in part, in FIG. 4).

The other type of fault discussed above is the misalignment of multiplexed signals. If a demultiplexer, 34 say, in one station (31) somehow becomes unsynchronised with the corresponding multiplexer 27 in the other station (25), so that the information from the one channel 21 which has been inverted is applied at the receiver side to one of the other channels (22, 23, 24) which does not include an inverter, inverted data appears on two of the channels at the receiver side. One of these channels is the channel which has been inverted by inverter 26 and transmitted over the optical fibre transmission line 30 and is now appearing as the output of a different channel, and the other is information which has been transmitted over the line 30 in non-inverted state and which has then been inverted by the inverter 35 at the reception end of the channel which normally receives the inverted information. Thus, unless demultiplexer 34 is synchronised with multiplexer 27, two channels of information leaving the demultiplexer are inverted. One is always channel 21 and the other depends upon the degree to which the demultiplexer is out of step with respect to the multiplexer. Monitoring of the output channels for inverted information provides a means of determining the synchronism state between the multiplexer and demultiplexer in that if no channels output inverted information then the multiplexer and demultiplexer are in synchronism. If two channels output inverted information the multiplexer and demultiplexer may be unsynchronised or a reflective fault may have arisen. In the former case the separation of the channels which output inverted information provides a unique indication of the degree by which the multiplexer and demultiplexer are out of synchronism. Also, as previously explained, if all channels are inverted, this is indicative of a reflective fault.

Those skilled in the art will appreciate that there are various ways of monitoring the output channels in multiplexed systems and correcting for any loss of synchronism, and a number of methods are used in non-optical systems. In the standard 565 Mbit/sec system, the output channels are monitored continuously to carry out frame alignment and supervisory checks and also look for errors in line code. Errors in line code will certainly occur in channels outputting inverted information and there may also be frame alignemnt or supervisory errors. In one embodiment of the invention a times shift circuit may be provided and a controller to operate the time shift circuit in response to the detection by the monitor of inverted information. The control means may control the time shift applied by the time shift circuit in accordance with the separation of the outputs identified as being inverted, to try to bring the demultiplexer and multiplexer into synchronism. If a situation is reached where there are four inverted channels, then a reflective fault is identified. If there is a misalignment error, then resynchronisation can be achieved. As an alternative the time shift circuit may simply shift the phase of the signals by one channel each time inverted information is detected until synchronism between the multiplexer and demultiplexer is achieved or four inverted channels are identified. The time shift circuit may be, for example, a barrel shift circuit.

One embodiment of control circuit is shown in FIG. 4. Disinterleaver 34 comprises a barrel shift circuit 61. The data streams 21, 22, 23, 24 pass through the circuit 61 before exiting the disinterleaver. The outputs 21 to 24 are fed to conventional 565 Mbit/sec equipment (not shown) which includes error detection circuitry which outputs loss of alignment signals LOA1, LOA2, LOA3 and LOA4, respectively. For the loss of alignment signals a "zero" indicates correct alignment and a "one" indicates loss of alignment. Channel 21 of 565 Mbit information is inverted in an inverter 26 before being fed to the interleaver 27. One output from the barrel shift circuit 61 corresponding to channel 21 is also fed through inverter 35. The barrel shift circuit 61 includes shift control inputs connected to shift control lines C1 and C2. The apparatus includes a programmed read-only memory 63, latch circuits 65 having a clock signal input 67 and a monostable timing circuit 69. The latch circuits 65 emit a triggering signal A to the timer circuit 69 and the timer circuit 69 emits a control signal Q which is fed to the latch circuits 65. Status lines S1 and S2 link the latch circuit 65 and the programmed read-only memory 63.

The loss of alignment signals LOA1, LOA2, LOA3 and LOA4 are used to control the state of the barrel shifting circuit 61 to vary the synchronisation of disinterleaver 34 relative to the interleaver 27. The programmed read-only memory 63 is loaded with a look-up table, which is addressed by the loss of alignment signals LOA1, to LOA4, the present status of the system, the data appearing on status lines S1 and S2 and the present state of the barrel shifting circuit 61 as indicated by the signals appearing on control lines C1 and C2. These signals define a particular address location in the memory 63 at which is located the new control code to be fed to the control lines C1, C2 the new system status information to be fed to status lines S1 and S2 and the triggering signal A for the timer 69. The new control code and new system status information at triggering signal A are fed from the memory 63 to the latch circuits 65 and from there the control code is applied via the control lines C1 and C2 to the barrel shift circuit 61 to maintain it in its present state if the system is in synchronism or to shift the circuit 61 to vary the alignment by one digit. If this achieves synchronisation or generates four inverted channels, then no further shift is made. If not, further shifts are made until either of these conditions occurs.

It will be appreciated that, purely for detecting a break in a fibre, a multi-channel station at one end of the fibre may invert the data in all channels, whilst the station at the other end does not invert the channels it transmits. However, by selectively inverting one or more channels in each direction it is possible to look for, and correct, synchronisation errors as well as identifying reflective faults, as described above.

In the above 2×4 channel system, one of the four channels travelling in one direction is inverted, together with three channels in the opposite direction. If, alternatively, two channels in each direction are inverted, then breaks can still be located, provided the two channels inverted in one stream are distinguishable from the channels inverted in the other stream once streams are multiplexed. For example, alternate channels (first and third or second and fourth) may be inverted in one direction and adjacent channels (fourth and first, first and second, etc) in the opposite direction.

Thus, more generally, for a bi-directional multi-channel system, one or more of the channels transmitted by each station is inverted, the number and position of inverted channels being chosen so that a break in the fibre is distinguishable; a misalignment slip is also identifiable and correctable. The data transmitted is conveniently in digital format, but the invention is also applicable to certain analogue systems.

Although the invention has been illustrated with reference to 2×1 and 2×4 channel systems, two, eight, sixteen, thirty-two or, indeed, any desired number up to many thousands of channels may be transmitted on the single line in each direction. The line, as previously indicated, may be a single optical fibre or other light transmitting medium. The number of channels transmitted in one directon may be different from the number transmitted in the opposite direction.

The invention is, furthermore, applicable to three or more stations transmitting over a single line. For example, two stations at one end of a single optical communicatins line may transmit data to, and receive data from, one or more stations at the opposite end of the line. An inversion scheme very similar to that described above can be implemented, and reflective fault and alignment information may be provided by appropriately positioning inverters so that reflections are unambiguously identified and loss of alignment can be corrected. Data may be multiplexed by a time division multiplexer or, alternatively, by other multiplexing techniques such as frequency division multiplexing. The receiver and transmitter at each station need not be located in close proximity.

As previously indicated, additional individual inverters need not necessarily be provided for the selected inversion of channels, as conventional hardware is generally able to invert signal channels.

The systems described above have the advantage that errors can be detected conveniently and easily, simply by inverting one or more data channels at the receiving and transmitting ends and carrying out straightforward checks on data received. It is not necessary to change the coding or add additional bits to the information signal, which could be expensive and also would reduce the capacity of the line to some extent.

We claim:

1. A continuously bi-directional, full duplex, optical communications system comprising:
   first and second stations, each having transmitting and receiving means located at respectively corresponding opposite ends of a single optical transmission line,
   means for inverting data at one or both stations prior to transmission on the line so that the originating end is identifiable, and
   means associated with one or both stations for checking received data and for indicating a fault condition if data received at its station was transmitted from that same end.

2. An optical communications system as in claim 1, wherein each station is adapted to transmit a single channel of data on said line, the first station having an inverter to invert information to be transmitted and the second station having an inverter to invert received information.

3. An optical communications system as in claim 1, wherein at least one station is adapted to transmit data on a plurality of channels and includes a multiplexer to multiplex the data onto said line.

4. An optical communications system as in claim 3, including means for inverting data in at least one, but not all, of said channels transmitted by each station transmitting a plurality of channels.

5. An optical communications system as in claim 4, wherein both stations are adapted to transmit a plurality of channels, and the inverting means are so arranged that, in use, the sequence of inverted and non-inverted channels transmitted in one direction is different from the sequence of inverted and non-inverted channels transmitted in the other direction.

6. An optical communications system as in claim 5, wherein the first station is adapted to transmit inverted data on all except one of the channels being transmitted by the first station, and the second station is adapted to transmit non-inverted data on all except one of the channels being transmitted by the second station.

7. An optical communications system as in claim 6, wherein each station is adapted to reinvert received data from channels which, under fault-free conditions, were inverted before multiplexing.

8. An optical communications system as in any one of claims 5, 6 or 7, including supervisory and error detecting means disposed at both ends of said line and connected to detect whether received data is within predetermined system specifications and wherein said inverting means are located to invert data prior to transmission to enable said supervisory and error detecting means to distinguish, from the inversion condition of received data, a reflecting fault condition from a loss of synchronism of received data.

9. An optical communications system as in claim 8, including a controller connected to respond to said supervisory and error detecting means adapted to resynchronise data received from said line after identification of a fault.

10. An optical communications system according to claim 9, including:
    a time shift circuit and control means to operate the time shift circuit in response to the detection by the supervisory and error detecting means of incorrectly inverted information indicating a possible loss of alignment,
    the control means controlling the degree of time shift applied by the time shift circuit until the data is resynchronised or a reflecting fault condition is identified.

11. An optical communications system as in claim 7, including:
    a first demultiplexer connected to input and output ports, respectively, of a first optical directional coupler at one end of the optical transmission line,
    a second multiplexer and a second demultiplexer connected to input and output ports, respectively, of a second optical directional coupler at the other end of the optical transmission line,
    an inverter connected to one input of the first multiplexer and another inverter connected to the corresponding output of the second demultiplexer,
    inverters connected to all except one of the inputs to the second multiplexer, and
    further inverters connected to the corresponding all except one of the outputs from the first demultiplexer.

12. A method of operating a continuously bi-directional optical communications system comprising:
    inverting some but not all data to be transmitted between station at opposite ends of a single optical transmission line so that data originating from a predetermined end of the line is identifiable, and
    checking the inversion condition of data received at one or both ends of said line to identify a fault condition in the event that data received at an end of the line was transmitted from that same end of the line.

13. A method as in claim 12, including selectively inverting data received at an end of the line so that during fault-free conditions, data inverted before transmission at the other end of the line is reinverted.

14. A method as in claim 12 or 13, including multiplexing data onto a plurality of channels at each end of the transmission line prior to transmission on the line.

15. A method as in claim 13, including inverting the data on all but one of the channels transmitted from one end of the line and inverting the data on only one of the channels transmitted from the other end of the line.

16. A method as in claim 14 or 15, including supervising the data received at an end of the line to identify both reflecting fault conditions and misalignment errors.

17. A method as in claim 16, including distinguishing reflecting faults from loss of alignment and correcting loss of alignment.

* * * * *